(12) United States Patent
Thune et al.

(10) Patent No.: US 7,142,511 B2
(45) Date of Patent: Nov. 28, 2006

(54) TELECOMMUNICATION SYSTEM COMPRISING ATM CORE NETWORK

(75) Inventors: Ulf Thune, Huddinge (SE); Gregory Barnicoat, Tyresö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 900 days.

(21) Appl. No.: 09/905,905

(22) Filed: Jul. 17, 2001

(65) Prior Publication Data
US 2003/0007495 A1    Jan. 9, 2003

(30) Foreign Application Priority Data
Jul. 9, 2001    (SE) .................................... 0102457

(51) Int. Cl.
H04J 1/16    (2006.01)
H04J 3/14    (2006.01)

(52) U.S. Cl. ............... 370/230.1; 370/352; 370/395.3; 370/395.52; 370/465; 370/467; 370/469; 455/432.1

(58) Field of Classification Search ............... 370/229, 370/230, 352, 355, 356, 395.1, 395.3, 395.52, 370/402, 465, 467, 469, 230.1; 455/432.1
See application file for complete search history.

(56) References Cited

U.S. PATENT DOCUMENTS 6,286,049 B1 * 9/2001 Rajakarunanayake et al. .......................... 709/227
6,683,877 B1 * 1/2004 Gibbs et al. ............. 370/395.2
6,765,903 B1 * 7/2004 Allen et al. ................. 370/356
6,822,961 B1 * 11/2004 Constantinof et al. ... 370/395.2
2002/0159442 A1 * 10/2002 Quigley et al.
2003/0053463 A1 * 3/2003 Vikberg et al.
2004/0013108 A1 * 1/2004 Ruckstuhl

FOREIGN PATENT DOCUMENTS

EP          0 961 519 A    12/1999
WO    WO 01 71993 A     9/2001

OTHER PUBLICATIONS

Singer J et al: "Narrowband Services Over ATM Networks: Evaluation of Trunking Methods" ISS '97. World Telecommunications Congress. (International Switching Symposium). Global Network Evolution: Convergence or Collision? Toronto, Sep. 21-26, 1997, ISS. World Telecommunications Congress. (International Switching Symposium), Toronto, P, vol. 2, Sep. 21, 1997, pp. 17-25, XP000704451 abstract.

* cited by examiner

Primary Examiner—John Pezzlo
Assistant Examiner—Inder Pal Mehra (57) ABSTRACT

The invention relates to a telecommunication system comprising an ATM core network and at least one MGW, wherein the MGW is connected on its network side to the ATM core network, and where the termination on the other side of the MGW is done on an ATM interface comprised of Permanent Virtual Connections, PVC that are configured to emulate a standardised TDM interface, in order to obtain seamless connectivity between the core network side and the other side of the MGW.

9 Claims, 5 Drawing Sheets

TELECOMMUNICATION SYSTEM COMPRISING ATM CORE NETWORK

TECHNICAL FIELD OF THE INVENTION

The invention relates to a telecommunication system, and particularly to a telecommunication system comprising an Asynchronous Transfer Mode ATM core network and at least one Media Gateway MGW, wherein the MGW is connected on its network side to the ATM core network.

DESCRIPTION OF RELATED ART

ATM is a packet-oriented transfer mode, which uses asynchronous time division multiplexing techniques. Packets are called cells.

At its termination points, an ATM network is connected to terminal equipment, e.g. ATM network users or Media Gateways MGW. Typically between ATM network termination points there are plural switching nodes, the switching nodes having ports, which are connected together by physical transmission paths or links. Thus, in travelling from an originating terminal equipment to a destination terminal equipment, ATM cells forming a message may travel through several switching nodes.

A switching node has a plurality of ports, each of which can be connected via a link circuit and a link to another node. The link circuit performs packaging of the cells according to the particular protocol in use on the link. A cell incoming to a switching node may enter the switching node at a first port and exit from a second port via a link circuit onto a link connected to another node. Each link can carry cells for plural connections, a connection being e.g. a transmission between a calling subscriber or party and a called subscriber or party.

The switching nodes each typically have several functional parts, a primary of which is a switch core. The switch core essentially functions like a cross-connect between ports of the switch. Paths internal to the switch core are selectively controlled so that particular ports of the switch are connected together to allow a packets ultimately to travel from the ingress side of the switch to the egress side of the switch, and ultimately from the originating terminal equipment to the destination terminal equipment.

The function of the MGW is to facilitate the connection of Time Division Multiplexing TDM based telephony equipment to an ATM network. The MGW provides functions for the conversion of TDM coded information into packets i.e. cells, suitable for transmission through an ATM network. This process is known as the ATM adaptation layer, AAL and several different adaptation types have been standardised. One method, AAL1 supports the coding of individual TDM channels to ATM virtual circuits VC. The MGW is also able to establish virtual circuit connections VCC through the ATM network to another MGW. Virtual circuits maybe established permanently, called Permanent Virtual Circuits PVC, or dynamically, called switched virtual circuits SVC.

SUMMARY OF THE INVENTION

The advantages of transmitting voice information over a packet or cell switched network has long been recognised. The relative cost of utilising packet switched networks such as an ATM network in place of a circuit switched network has generated growing interest and many telecom operators now claim that packet switching surpasses circuit switched voice transmission in terms of bandwidth usage in their networks. However, it is also becoming increasingly interesting for network operators to enable telephone calls originating in a standard circuit switched network to be routed at least in part via a packet switched network without altering the way in which a user utilises a telephone or other telephony equipment.

As packet switched technology gains importance compared to circuit switching, there is a need to incorporate more of the advantages of packet switched functions into a telecommunication system. Yet, if telecom operators are to continue receiving returns on the substantial investment represented by a circuit switched infrastructure, there is similarly a need to retain as much as possible of the circuit switched system.

The object of the invention is to refine a telecommunication system comprising an ATM core network and at least one MGW, wherein the MGW is connected on its network side to the ATM core network, and where the termination on the other side (access side) of the MGW is an ATM interface comprised of Permanent Virtual Connections PVC that are configured to emulate a standardised TDM interface.

The method and arrangement according to the invention has the following advantages: By using protocols that are conventionally utilised by the counterpart circuit switched system elements, the transition from circuit switched to ATM based packet switched network can be achieved in a fast, cheaper and more secure fashion, since the network elements will be interchangeable with different vendor equipment. Furthermore, the existing services (e.g. telephony) supported by these standard protocols are then supported in the NGN.

Abbreviations
AAL1: ATM adaptation layer 1
AAL2: ATM adaptation layer 2
AAL5: ATM adaptation layer 5
aDSL: Asymmetrical DSL
ATM: Asynchronous transfer mode
BB: Broad band
CIC: Circuit Identification Code
CPE: Customer Premise Equipment
DSL: Digital subscriber line
DSP: Digital Signal Processor
DSS 1: Digital Subscriber Signalling system No. 1
E1: ETSI 2 Mbit/s interface
GR-303: Subscriber Line Multilink access interface standardised by ANSI
GW: Gateway
H.248: ITU-T recommendation for media gateway control protocol
IAM: Immediate Address Message
IP: Internet Protocol
ISDN: Integrated services digital network
ISP: Internet Service Provider
ISUP: ISDN Signalling User Part
ITU-T: International Telecommunications Union, Telecommunications Standardisation Sector
IWU: Interworking Unit
LE: Local Exchange
LES: Line Emulation Signalling
MGC: Media Gateway Controller
MGCP: Media Gateway Control Protocol, e.g., H.248
MGW: Media Gateway
MGW-O: Media Gateway, Originating
MGW-T: Media Gateway, Terminating
NGN: New Generation Network PBX: Private Branch Exchange
POTS: Plain old telephone service
PSTN: Public switched telephone network
PVC: Permanent Virtual Connection
RAS: Remote Access Service
RTP: Real Time Protocol
SG: Signalling Gateway
SHDSL: Super High rate Digital Subscriber Signalling
SIP: Session Initiation Protocol
STM: Synchronous Transport Module
SVC: Switched Virtual Connection
T1: ANSI standardised 1.5 Mbit/s interface
TCP: Transmission Control Protocol
TDM: Time Division Multiplexing
TeS: Telephony Server
V5.2: ITU-T Rec. 965, V-Interfaces at the digital local exchange (LE)—V5.2 interface (based on 2048 kbit/s) for the support of access network (AN)
VGW: Voice Gateway
VoCABLE: Voice over cable
VoDSL: Voice over DSL
xDSL: collective term for the family of DSL technology

BRIEF DESCRIPTION OF THE DRAWINGS

The invention will be described in more detail below with reference to the accompanying drawings, wherein.

DETAILED DESCRIPTION OF EMBODIMENTS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practised in other embodiments that depart from these specific details. In other instances, detailed descriptions of well-known devices, circuits, and methods are omitted so as not to obscure the description of the present invention with unnecessary details.

Figure 1:
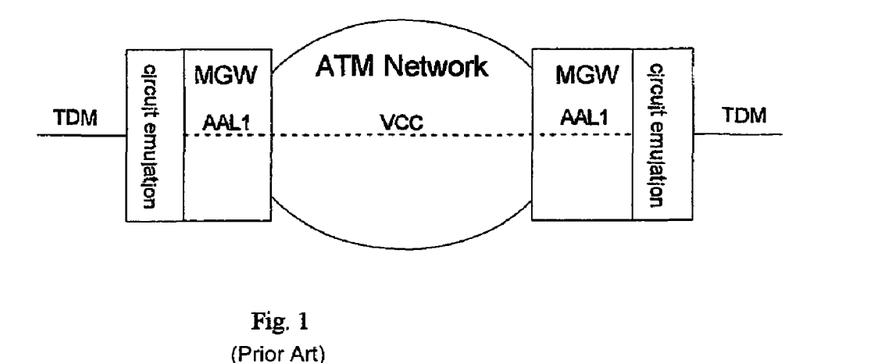
FIG. 1 shows schematically a prior art ATM core network with MGWs utilising Virtual Circuit Connections for the interconnection of TDM interfaces.

FIG. 1 shows schematically a prior art ATM core network with MGWs utilising Virtual Circuit Connections for the interconnection of TDM interfaces. The function of the MGW is to facilitate the connection of TDM based telephony equipment to an ATM network. The MGW provides functions for the conversion of TDM coded information to packets i.e. cells, suitable for transmission through an ATM network. This process is known as the ATM adaptation layer AAL and several standardised adaptations have been specified. One method, AAL1 supports the coding of individual TDM channels to ATM virtual circuits VCs. The MGW is also able to establish virtual circuit connections VCCs through the ATM network to another MGW. Virtual circuits may be established permanently, called permanent virtual circuits PVC or dynamically called switched virtual circuits, SVC.

Figure 2:
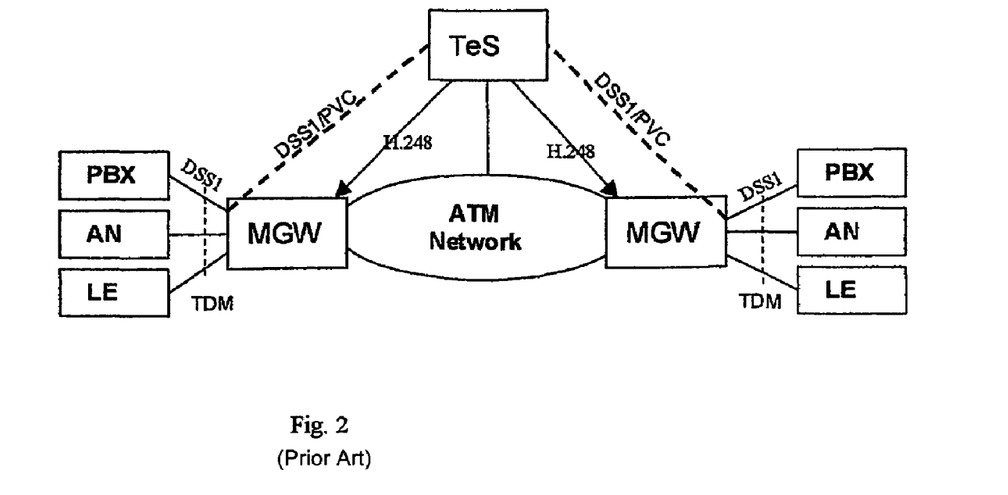
FIG. 2 shows schematically a prior art New Generation Network with ATM core network providing traditional telephony services.

FIG. 2 shows schematically a prior art New Generation Network with ATM core network providing traditional telephony services. The basic network configuration for the provision of telephony services by a "New Generation Network" NGN is shown. In the prior art telecommunication networks one or more Telephony Servers TeS are connected to the ATM core network via ATM interfaces. The TeS consists of an ATM switch and a Telephone Service platform. Traditional telephone components such as Local Exchanges LE, PBX and Access concentration Nodes AN are connected to a MGW via TDM interfaces.

At the access to the MGW, the common channel signalling CCS protocol, e.g. DSS1, V.5.2 or ISUP, is converted to a PVC using a suitable ATM adaptation (e.g. AAL1 or AAL5) and is transported over the ATM network to the TeS. At the TeS the CCS protocol is processed by the Telephony platform. Also at the access, the TDM channels carrying bearer information are adapted to ATM VCs using AAL1 type adaptation. These VCs may be switched internally within the MGW, or transported through the ATM network to another MGW. In both cases, the Telephony platform controls connection both within the MGW and between the MGWs via a MGW control protocol MGCP, e.g. H.248.

Because of the Internet and broadband access transmission systems, e.g. a DSL or TV Cable networks, there is a need to connect newer type of equipment to a MGW.

Figure 3:
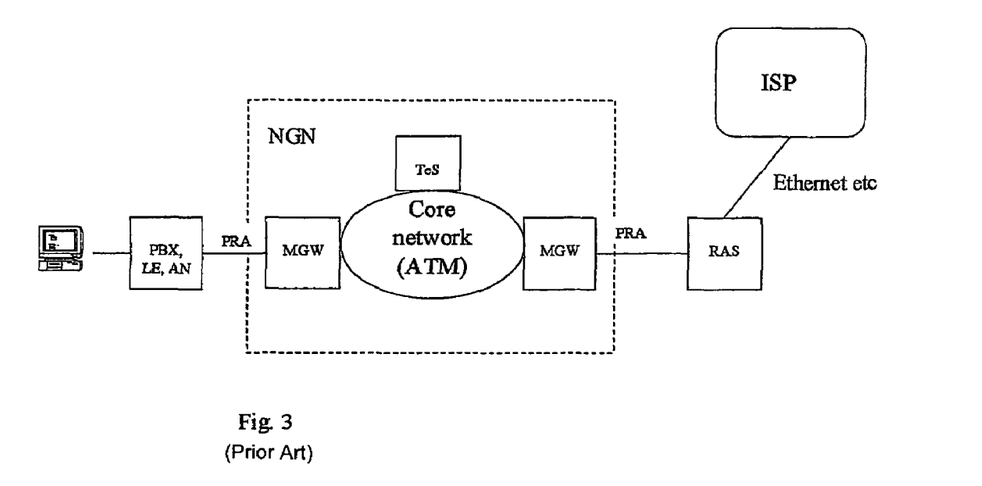
FIG. 3 shows schematically a prior art Remote (e.g. Internet) Access Server connected to a MGW forming a part of a NGN.

FIG. 3 shows schematically a prior art Remote Access Server (an Internet Gateway) connected to a MGW forming a part of a NGN. The telecommunication system comprises a NGN as described above, and a user terminal equipment comprising a computer system with a modem connected via the PSTN to the originating MGW. At the destination MGW, Remote Access Server RAS equipment is connected via a PRA, i.e. TDM interface using DSS1 call control protocol. The RAS equipment terminates the calls originating from the computer system and performs protocol conversion that enables connection to the Internet, e.g. via an Internet Service Provider ISP. It should be noted that the RAS equipment converts the incoming TDM coding information to packet based protocol.

The RAS application enables computer system to accessing the Internet via dial-up connections through the NGN to the ISP. In this system, Internet traffic is routed through the ATM core network directly to the RAS equipment placed near the ISP access.

Figure 4:
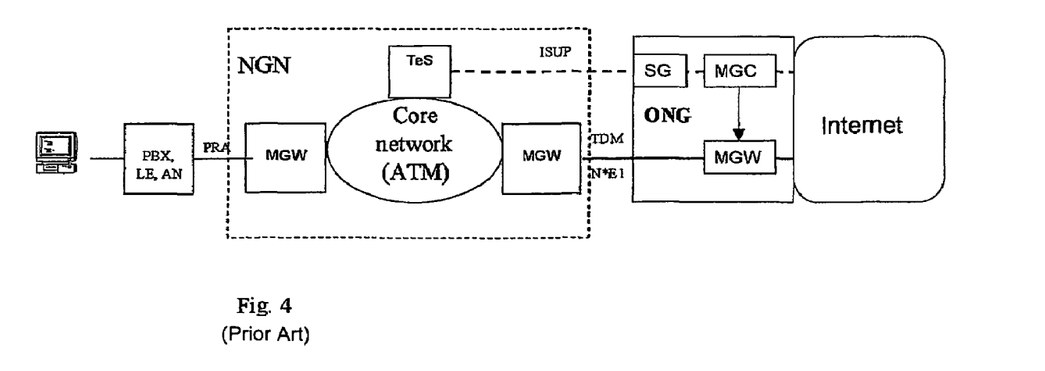
FIG. 4 shows schematically a prior art IWU being an Internet Gateway connected to a NGN.

FIG. 4 shows schematically a prior art Interworking Unit, IWU being a Internet Gateway connected to a NGN, the IWU consisting of a Signalling Gateway SG, a Media Gateway Controller MGC and a MGW. The SG interworks the PSTN call control protocol, e.g. ISUP with the IP based control protocol e.g. SIP. The MGW in the IWU converts the TDM bearer channel into IP based media streams. The telecommunication system comprises a NGN as described above, a multi-media terminal with a modem connected via the PSTN to the originating MGW. At the destination MGW, IWU equipment is connected via an ISUP route i.e., TDM interface using the ISUP call control protocol. The IWU equipment functions as a gateway for calls between the multi-media terminal and the Internet. It performs signalling protocol and media stream conversions. In this embodiment, Internet traffic is routed through the ATM core network directly to IWU. In this arrangement the Internet is connection to the NGN is via an inter-operator arrangement.

Figure 5:
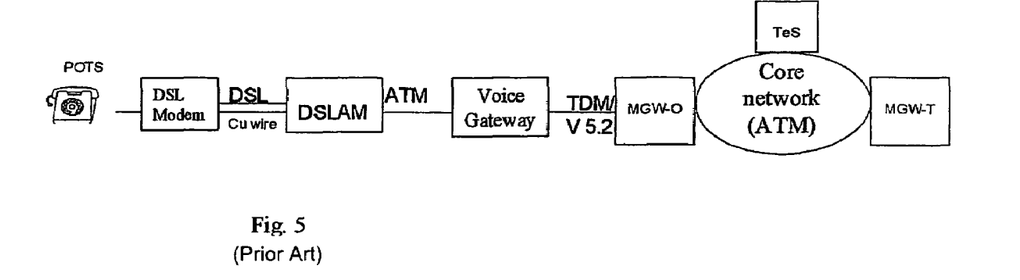
FIG. 5 shows schematically a prior art VoDSL access to a NGN.

FIG. 5 shows schematically a prior art VoDSL access to a NGN, i.e. a Digital Subscriber Line DSL access system for the provision of telephony services via a NGN. DSL technology such as aDSL and SHDSL uses copper wire pairs to obtain broadband transmission data rates up to several Mbit/s. The DSL modem is CPE and provides access interfaces for data terminals and voice terminals such as an analogue telephone. The Digital Subscriber Line Access Multiplexor, DSLAM terminates the DSL transmission and separates and aggregates the Data and Voice data streams. The ATM Forum has standardised the signalling protocols, Line Emulation Signalling LES (afvmoa-0145.000, "Loop Emulation Service using AAL2) for the emulation of narrow band voice terminal access across a DSL transmission system. The function of the Voice Gateway, VGW, is to terminate the voice and LES data streams and convert them into standardised PSTN access links such as V5.2 or GR-303, which are both TDM based. The connection between the VGW and the NGN is via such a TDM interface.

It should be noted that the Voice Gateway equipment converts the incoming ATM coding information to a TDM interface.

The present invention refines a telecommunication system by using an interconnection based on an ATM interface between a MGW forming a part of a NGN and other (attached) equipment being access or gateway equipment, whereby the ATM interface incorporates a number of PVCs that are equivalent to a TDM interface incorporating bearer and signalling channels. The telecommunication system according to the invention comprises thus an ATM core network and at least one MGW, wherein the MGW is connected on its network side to the ATM core network, and where the termination on the other (attachment) side of the MGW is an ATM interface comprised of Permanent Virtual Connections, PVCs that are configured to emulate a standardised TDM interface. Specifically the information transported in each PVC forming a part of the ATM interface is the logical equivalent of a channel of a TDM interface. The PVCs are grouped into one or more logical routes wherein each logic route contains one or more PVCs used for the transport of bearer information. Each logical route may also contain one or more PVCs used for the transport of signalling protocol for the control of the associated bearer PVCs. For each logical route, the PVCs in both the MGW and the attached equipment are pre-configured such that the Channel Identities values referenced in the signalling control protocol are mapped to PVC identities so as to obtain a one-to-one correspondence.

In the embodiments described hereinafter the information carried in the bearer PVCs is coded using AAL1 so as the match the coding used in the NGN, however other ATM adaptation methods could be used. The PVCs used for signalling information may be coded as either AAL1 or AAL5 so as the match the coding method used in the NGN.

In the NGN, the signalling PVC is transported to the Telephony Server Platform using an ATM virtual connection. The bearer PVCs are connected to the switching function included in the MGW and are either switched internally within the MGW or to the core network under the control the Telephony Server platform using the capabilities of the MGCP.

Figure 6:
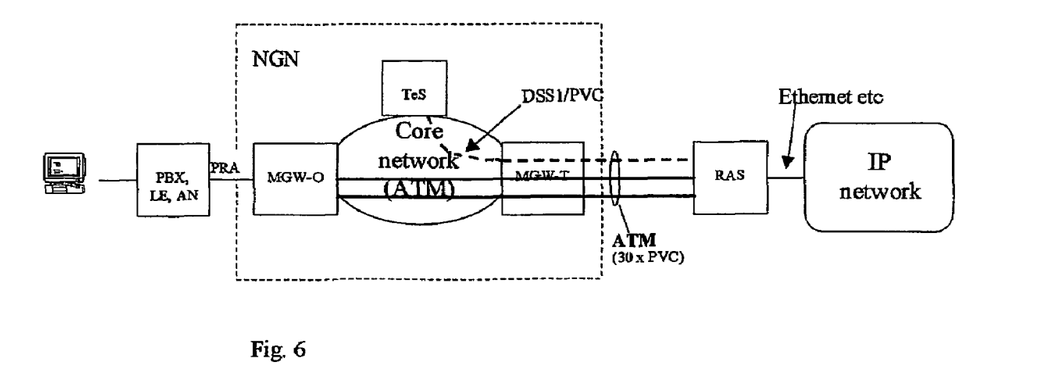
FIG. 6 shows schematically a RAS to NGN interface using an ATM connection according to a first embodiment of the present invention.

FIG. 6 shows schematically a RAS to NGN interface using an ATM connection according to a first embodiment of the present invention. In this embodiment of the telecommunication system according to the invention, the MGW is connected on the said attachment side of the MGW to an Remote Access Server, e.g. to an access gateway being a device for interconnecting the NGN to an access network, by an ATM interface comprised of Permanent Virtual Connections, PVCs that are configured to emulate an ISDN Primary Rate Interface (PRI), in order to obtain seamless connectivity between access network and core network. According to this embodiment, the prior art telecommunication system shown in FIG. 3 is refined by using an interconnection based on ATM connection between the second MGW, MGW-T, and the RAS equipment. This embodiment works in the following way: A call is routed from the first or originating MGW, MGW-O, to the MGW-T, using normal TeS call control functions as described before for a NGN. In this case the TeS routes the call to an outgoing PRI route that is connected to MGW-T. However, at the MGW-T, the bearer connection is terminated in a PVC (bearer PVC) on the ATM interface instead of a timeslot in an TDM interface as is the case in the prior art embodiment shown in FIG. 3. The PVCs are pre-configured in both MGW-T and RAS by mapping the Channel Identities values, which are referenced in the DSS1 protocol to the PVC identities. Furthermore, the DSS1call control protocol (Rec. Q.931), which is sent from the TeS to the MGW in a PVC is terminated directly on the ATM interface in a pre-configured "signalling PVC". The signalling PVC in RAS equipment is also pre-configured and the RAS equipment is able to extract the DSS1protocol information from the PVC without first converting it to TDM format. The RAS equipment processes the Q.931 messages. The SETUP message sent across the ATM interface includes a Channel Identifier and the RAS equipment is pre-configured to associate the Channel Identity with a particular "bearer PVC" identity. The "bearer PVC" is AAL1 coded, and the DSP function in the RAS equipment extracts the voice frequency encoded information directly without first converting it to TDM format code. This process results in less data processing in the DSP. In this embodiment, the ATM interface can support many logical PRI routes thus resulting in considerable cost savings. In this embodiment, the telecommunication system comprises at least one TeS that is capable of processing the common channel signalling protocol transported across the ATM interface in one or more PVC and the standardised TDM interface call control protocol is any common channel signalling protocol.

Figure 7:
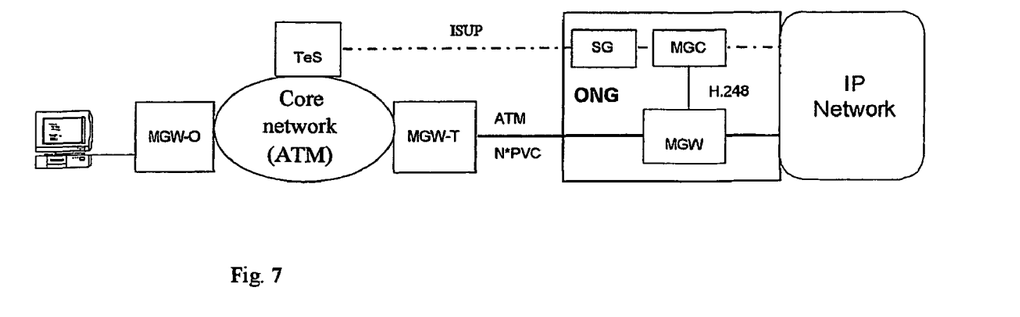
FIG. 7 shows schematically a NGN connected to an IWU via an ATM connection according to a second embodiment of the present invention.

FIG. 7 shows schematically a NGN connected to an Interworking Unit, IWU via an ATM connection according to a second embodiment of the present invention. In this embodiment of the telecommunication system according to the invention the MGW is connected on said attachment side of the MGW to an IWU, being a device for interconnecting an NGN to another packet network, by an ATM interface comprised of Permanent Virtual Connections PVC that are configured to emulate an inter-exchange ISUP route, in order to obtain seamless connectivity between terminating device and core network. According to this embodiment, the prior art telecommunication system shown in FIG. 4 is refined by using an interconnection based on ATM transport between the terminating MGW, MGW-T, and the IWU equipment. That is, the IWU is connected to the ATM core network via an ISUP route using an ATM connection at the second MGW. This embodiment works in the following way:

A call is routed from the first or originating MGW, MGW-O, to the terminating MGW, MGW-T, using normal TeS call control functions. In this case the TeS routes the call to an outgoing ISUP route that is connected to MGW-T. However, at the MGW-T, the bearer connection is terminated in a "bearer PVC" on the ATM connection instead of a timeslot in an TDM interface as for the case shown in FIG. 4. The PVCs are pre-configured in both the MGW-T and the IWU by mapping the Circuit Identities (CIC values), which are referenced in the ISUP protocol to PVC identities.

The ISUP signalling connection between the TeS and the IWU may be established in any convenient manner. It may for example, be a TDM based connection or a signalling PVC in ATM interface carrying the bearer PVCs. When the IAM message is sent from the TeS to the Signalling Gateway, SG the CIC value identifies the bearer connection associated the call. The SG terminates the call and passes control to the MGC, which is able to translate the CIC value to a pre-defined PVC termination in the MGW. The MGC controls switching and formatting of media streams terminating in the MGW. The MGC may use H.248 as the MGW control protocol. The MGW transcodes the AAL1 media stream to an IP media stream without using intermediate TDM translation. In the case where the media stream is speech then the transcoding can be performed with minimal time delay which will improve the quality of service for connections between the IP network and the NGN. In this embodiment, the ATM interface can support many logical ISUP routes thus resulting in considerable cost savings. In this embodiment, the telecommunication system comprises at least one TeS that is capable of processing the common channel signalling protocol transported across the ATM interface in one or more PVC and the standardised TDM interface call control protocol is any common channel signalling protocol.

Figure 8:
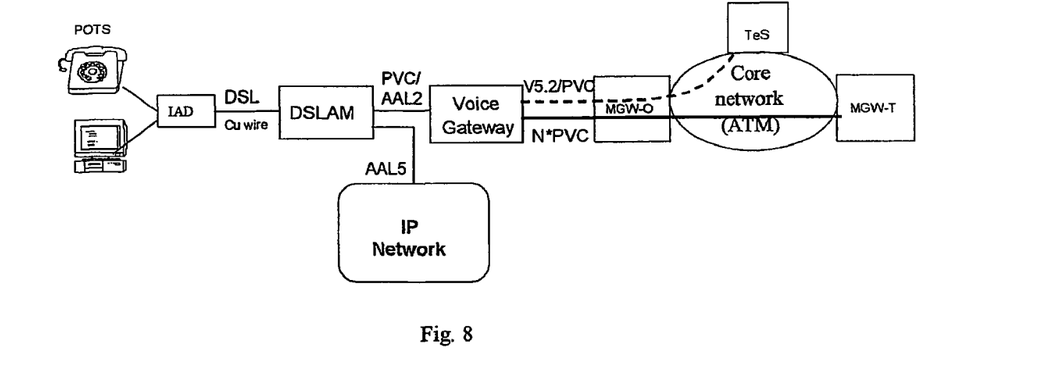
FIG. 8 shows schematically a VoDSL Access System connected to a NGN via an ATM connection according to the invention.

FIG. 8 shows schematically a VoDSL Access System connected to a NGN via an ATM connection according to the invention. The DSL transmission standards allow data to be transmitted using several different protocol stacks for which the most common are ATM, IP/TCP and Frame Relay. For VoDSL, the DSL Forum has standardised the use of ATM transmission. This embodiment works in the following way:

The DSL Modem receives data from both the data and voice terminals. The modem uses separate PVC:s for encoding data and voice streams. The DSLAM terminates the DSL transmission system and separates the voice and data (Internet) streams. The DSLAM aggregates the data streams and passes them onto the IP network using well-known technologies. The DSLAM aggregates the voice streams from many telephony subscribers by multiplexing the PVCs on to one ATM link for connection to the VGW. For each voice terminal, the DSL modem processes both voice streams and telephone signalling protocols or events according to the ATM Forum standard af-vmoa-0145.000, "Loop Emulation Service using AAL2. According to this standard the telephone related data is coded into separate AAL2 sub-channels. In each PVC, there are three data streams one for voice, one for signalling and one for management, which are coded into separate AAL2 sub-channels.

The function of the VGW is to terminate PVC and process the information into a format suitable for connection to the Telephone Server System. In this embodiment the VGW is connected to the NGN via an ATM interface with the following characteristics. The ATM link is pre-configured into a logical route comprised of several PVCs. Each voice stream embedded in an AAL2 sub-channel, is processed by the VGW and converted to AAL1 format and switched to one of the PVCs that is reserved for bearer connections. The VGW may also perform voice codec translation to match the requirements of the NGN. Each of the signalling protocol streams embedded in an AAL2 sub-channel is processed and converted to common channel signalling protocol such as V5.2 or GR-303. This protocol stream is coded using a suitable ATM adaptation (e.g. AAL1 or AAL5) and is switched to the PVC in the interface that is reserved for signalling. In the NGN, the MGW routes this signalling PVC transparently to the TeS where the protocol is terminated as described earlier in this description. One of the functions of the V5.2 protocol is bearer channel assignment. Thus when the TeS receives an indication of a new call from the VGW it reserves a bearer channel in the V5.2 link. In this embodiment, the bearer channel indicated in the signalling control protocol (e.g., V5.2) is mapped to a "bearer PVC" in the ATM interface. The mapping of PVCs to channel identities is pre-configured and controlled by a management function.

The VGW also processes the management information embedded in each AAL2 subchannel. The management functions of the VGW are not shown in this description.

Figure 9:
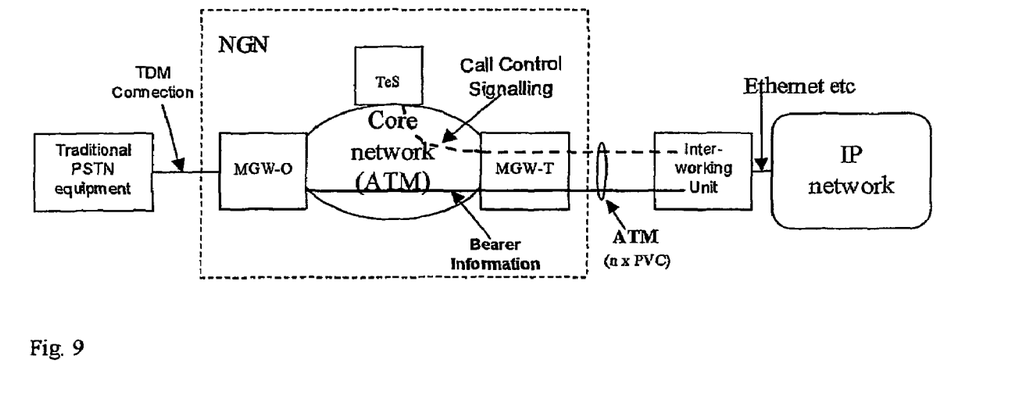
FIG. 9 shows schematically interworking between a NGN and an IP Network.
Figure 10:
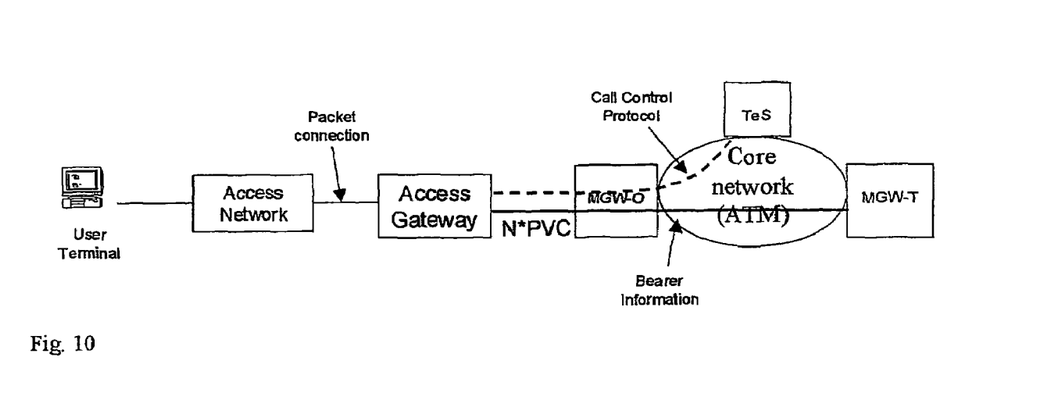
FIG. 10 shows schematically an Access Gateway connection to a NGN.

A further embodiment of this invention is for the connection between a NGN and another packet-based network. In this case, the ATM connection is used between the MGW of the NGN and an Interworking Unit as shown in FIG. 9. For the special case of interworking between two similar NGNs the IWU function may be null. Another embodiment the ATM connection of this invention is for the connection of access equipment to a MGW being a part of an NGN as shown in FIG. 10.

The invention claimed is:

1. A telecommunication system comprising:
   an ATM core network;
   at least one media gateway (MGW), wherein the MGW is connected on its network side to the ATM core network and wherein a termination on the other side of the MGW is done on an ATM interface comprised of Permanent Virtual Connections (PVCs) that are configured to emulate a standardized TDM interface;
   a remote access server (RAS) wherein said MGW is connected on said other side to said RAS, said RAS being a device for interconnecting said ATM core network to an access network using said ATM interface comprised of the PVCs that are configured to emulate said standardized TDM interface, in order to obtain seamless connectivity between said access network and said ATM core network;
   wherein the PVCs are pre-configured in both the MGW and RAS such that Channel Identity values, which are referenced in an access call control protocol are mapped to PVC identities; and
   a telephony server (TeS) for providing call control wherein a call control message sent between said TeS and said RAS includes a Channel Identifier, and the RAS is pre-configured to associate the Channel Identifier with the PVC identities used by the MGW.

2. The telecommunication system according to claim 1, wherein the access call control protocol which is sent from the TeS to the MGW is terminated directly on the ATM interface in a pre-configured "signalling PVC".

3. The telecommunication system according to claim 2, wherein said RAS is able to extract and process the access control protocol information from the PVCs without first converting it to TDM format.

4. The telecommunication system according to claim 3, wherein bearer information processing functions in the RAS can process bearer information directly without first converting it to TDM format code.

5. The telecommunication system according to claim 1, wherein inter-network call control protocol which is sent from a telephony server (TeS) to the MGW is terminated directly on the ATM interface in a pre-configured "signalling PVC".

6. Telecommunication system according to claim 1, uses standardized inter-network call control protocol as common channel signalling protocol.

7. A telecommunication system comprising:
an ATM core network;
at least one media gateway (MGW), wherein the MGW is connected on its network side to the ATM core network, wherein a termination on the other side of the MGW is done on an ATM interface comprised of Permanent Virtual Connections (PVCs) that are configured to emulate a standardized TDM interface;
an Interworking Unit (IWU) wherein said MGW is connected on said other side to said IWU, being a device for interconnecting said ATM core network to another packet network, by said ATM interface comprised of the PVCs that are configured to emulate said standardized TDM interface, in order to obtain seamless connectivity between terminating device and said ATM core network;
wherein the PVCs in the MGW and IWU are pre-configured by mapping Circuit Identification Code Values (CIC values) which are referenced in an inter-networking call control protocol to PVC; and
a telephony server (TeS) for providing call control wherein a call control message sent between said TeS and said IWU includes a Channel Identifier, and the IWU is pre-configured to associate the Channel Identifier with the PVC identities used by the MGW.

8. The telecommunication system according to claim 7, wherein the IWU can transcode and otherwise process AAL1 coded bearer information directly without using a TDM intermediate translation.

9. The telecommunication system according to claim 7, wherein said IWU is able to extract and process inter-network call control protocol information from the PVCs without first converting it to TDM format.

* * * * *